United States Patent [19]

Muck

[11] Patent Number: 4,530,469

[45] Date of Patent: Jul. 23, 1985

[54] SUPPLY/SHUT-OFF VALVE

[75] Inventor: Jack E. Muck, Garfield Heights, Ohio

[73] Assignee: AccuSpray, Inc., Cleveland, Ohio

[21] Appl. No.: 544,219

[22] Filed: Oct. 21, 1983

[51] Int. Cl.³ .............................................. B05B 9/00
[52] U.S. Cl. ..................................... 239/569; 239/124
[58] Field of Search ............... 239/569, 124, 172, 127, 239/146, 150, 159, 160, 161, 162, 163, 164, 165, 169, 170, 176, 175; 222/611; 240/75, 74 B, 72, 70

[56] References Cited

U.S. PATENT DOCUMENTS

| | | | |
|---|---|---|---|
| 2,081,022 | 5/1937 | Smith | 239/124 |
| 3,606,168 | 9/1971 | Seamon, Jr. | 239/124 |
| 3,765,607 | 10/1973 | Pacht | 239/124 |

*Primary Examiner*—James B. Marbert
*Attorney, Agent, or Firm*—Sidney W. Millard

[57] ABSTRACT

An improved supply/shut-off valve for use in a multiple-user gas system wherein the valve is located in the gas supply line of each user, for the purpose of preventing pressure increases and decreases in the gas supply to each of the users when any of the other users is either added to or deleted from the multiple-user gas system.

6 Claims, 5 Drawing Figures

SUPPLY/SHUT-OFF VALVE

FIELD OF THE INVENTION

The invention relates to an improved supply/shut-off valve, and more particularly relates to an improved supply/shut-off valve for use in a multiple-user gas system of the type having a plurality of users.

BACKGROUND OF THE INVENTION

In multiple-user gas systems of the type having a plurality of users each of which is operating a separate although usually identical gas using apparatus, problems can occur when any one of those independent users either suddenly discontinues use, or if such a user was not previously using gas suddenly begins use. More specifically, an example of a multiple-user gas system would be a multiple station air operated spray painting system. In such a system each of a plurality of spray paint operators has a hand held air atomized spray gun, each gun of which is connected to a central or common air source. The problem occurs when any one of those operators either discontinues use or begins use of a gun that was not previously in use. The conventional supply/shut-off device provided at each of the air operated paint spray guns in a multiple-user system simply turns-on or turns-off the air supply without any consideration of the other operators. In a compressible gas system the volume of gas maintained in the lines to each of the multiple users from the common source will suffer either a pressure increase spike when use is discontinued or a sudden pressure decrease at the moment when use of a previously unused nozzle is commenced. This pressure increase or decrease is only a momentary occurence since the system is a flow system and each of the guns in use will quickly bleed off the excess pressure or the central air supply unit will make up the defficiency in pressure thereby overcoming the spike or dip, depending upon what has occurred. However, during that momentary pressure increase or decrease, the delicate balance between air usage and paint usage is interrupted. If there is a pressure increase the paint spray guns remaining in use will over-atomize the paint thereby causing "over-spray", which will result in an improper paint job or if a momentary pressure decrease occurs there will be under-atomization for a short period of time on the remaining nozzles resulting in paint globules of too large a size. Either of these conditions results in an improper paint job and heretofore there has been no practical method of solving such a problem, manufacturers and spray paint operators simply having learned to live with the problem.

Therefore, there is a need for an improved supply/shut-off device specifically for use in a multiple-user gas system of the previously described type that will allow for any one of the multiple gas users to either discontinue or to re-commence use of his gas using machine.

SUMMARY OF THE INVENTION

The present invention is a method of preventing gas pressure variations in a multiple-user gas system of the type previously described. At each of the independent gas users (machines) an improved supply/shut-off valve is installed in the gas supply line. The improved supply/shut-off valve is a valve having a valve body with inlet and outlet ports. The valve is completed with a valve internal that is mounted within the valve body. Additionally, means, as for example a handle, are provided for rotating the valve internal within the valve body between its various positions. The valve internal has an aperture which is configured in one position to the inlet and outlet ports of the valve body so that when the valve is in its supply position, gas will freely flow from the gas supply source through to the gas user machine. The valve internal additionally has a second position in which in the internal is positioned such that when the aperture of the rotatably mounted internal is not aligned with the inlet and outlet ports of the valve body, a diverting port is in communication with the inlet port and the exterior of the valve body. The diverting port is specifically sized to have the gas capacity and gas pressure drop of the gas user, machine.

BRIEF DESCRIPTION OF THE DRAWINGS

The best mode contemplated in carrying out this invention is illustrated in the accompanying drawings in which.

DESCRIPTION OF THE PREFERRED EMBODIMENT

Figure 1:
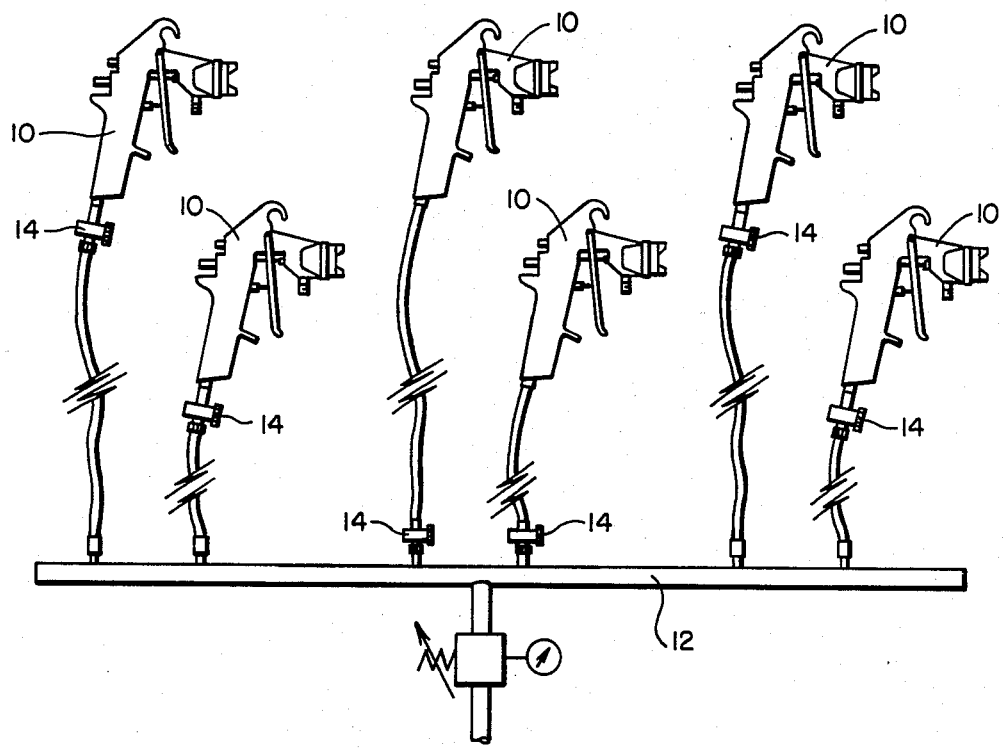
FIG. 1 is a schematic representation of a multiple-user gas system utilizing the supply/shut-off valve according to the present invention.

With reference to the drawings, FIG. 1 depicts a multiple-user system in which six, an arbitrary number, air atomized paint spray guns 10 are connected to a common compressed air source line 12. Each paint spray gun 10 has a supply/shut-off valve 14 in the compressed air line to the gun. When any operator operating his individual paint spray gun 10 desires to discontinue spray painting he will turn his supply/shut-off valve 14 to the off position. Additionally when such an operator returns to his paint spray gun 10, as for example, at the beginning of the work shift or after having discontinued use, he desires to commence or re-commence spray painting operations he will turn his supply/shut-off valve 14 to it on position. The supply/shut-off valve may be located at the spray gun 10 or at the manifold, both positions are shown in FIG. 1.

Figure 2:
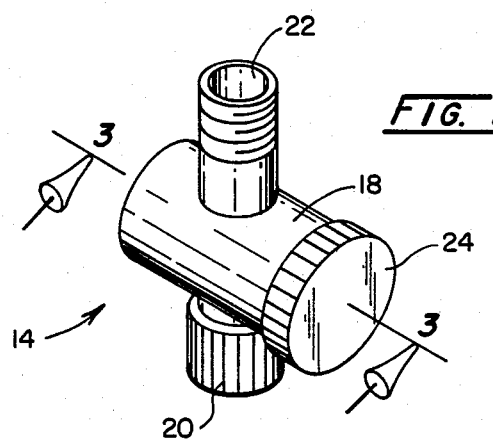
FIG. 2 is a perspective view of the supply/shut-off valve according to the present invention.

With reference to FIG. 2 which is a perspective view of the supply/shut-off valve 14 according to the present invention, which is a stem type valve in which the valve interal 16 is preferably a stem, rotatably mounted within valve body 18. The valve body 18 has inlet port 20 and outlet port 22 located 180° apart upon the valve body. Additionally in the embodiment shown in FIG. 2, a means 24 for rotating the valve internal 16 within valve body 18 is preferably a knob which in this case is simply an extension of the stem.

It will be appreciated that the rotatable valve internal may also be a ball and that a valve body configured to receive a bal type rotating valve internal would be equivalently effective.

Figure 3:
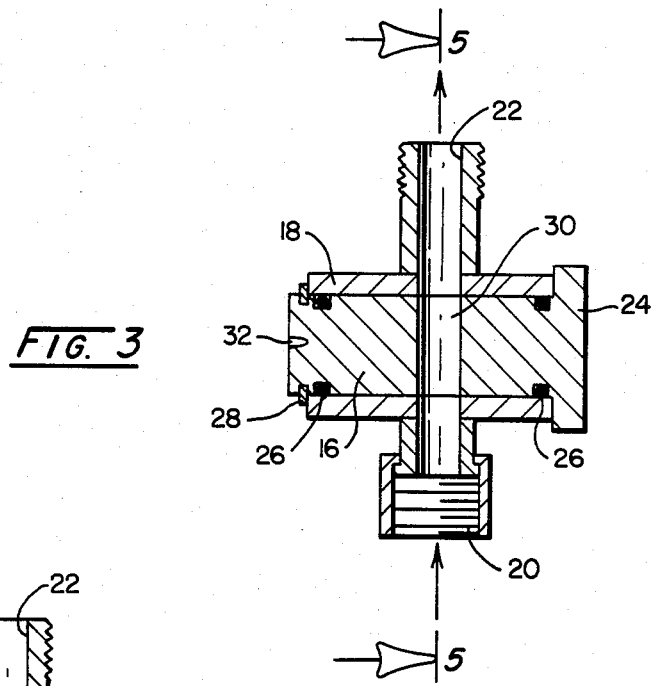
FIG. 3 is a cross section of the valve of FIG. 2 in the supply position taken along line 3—3 of FIG. 2.
Figure 4:
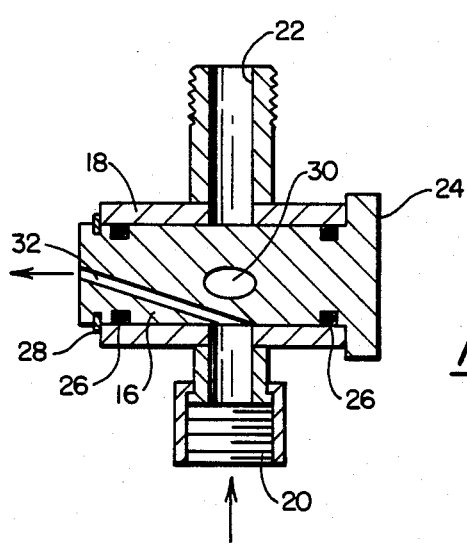
FIG. 4 is a cross section of the valve of FIG. 2 in the diverting position, the cross section taken along line 3—3 of FIG. 2.

The function of the supply/shut-off valve is more clearly understood by reference to FIGS. 3 and 4. Referring initially to FIG. 3, valve internal 16 can be seen mounted within valve body 18 and additionally the disposition of inlet port 20 and outlet port 22 relative to the valve internal and valve body is more clearly perceived. Valve internal 16 is rotatably maintained within valve body 18 by O-ring 26 and the end of the valve internal is maintained lockably within the valve body by retaining means 28. In the position of the valve internal within valve body 18 as shown in FIG. 3, compressed gas passing from the common compressed air source 12 travels to inlet port 20 through the aperture 30 which is bored through valve internal 16 and exiting the valve body via outlet port 22. It will be appreciated that aperture 30 is preferably a full-ported aperture relative to the inlet and outlet ports of the valve body 18 so that the pressure drop through the supply/shut-off valve to the paint spray gun 10 is minimized. The positioning of the valve shown in FIG. 3 is that position in which the operator would maintain the supply/shut-off valve 14 in order to operate his paint spray gun 10.

Turning now to FIG. 4 which represents the configuration of supply/shut-off valve 14 when the valve is in the shut-off position. In the cross sectional view represented in FIG. 4 again the positioning of the valve internal 16 relative to the valve body 18 and also relative to the orientation of inlet port 20 and outlet port 22 shows that flow through aperture 30 cannot occur. However, flow is achieved from inlet port 20 through diverting port 32 which in the configuration shown in FIG. 4 diverts the inlet air or gas to the atmosphere. The sizing of diverting port 32 is very critical indeed. Diverting port 32 is specifically sized and designed to have the same gas or air capacity as the paint spray gun 10 and additionally to have the same pressure drop as the paint spray gun 10 thereby simulating the existence of the paint spray gun 10 even when the air supply to that gun has been interrupted by the supply/shut-off valve 14.

In operation in a multiple-user system such as that shown in FIG. 1, supply/shut-off valve 14 functions to prevent a pressure increase when the supply of air to a particular paint spray gun has been interrupted by the operator or alternatively, the air pressure decrease that would normally be experienced by the initiation of air supply to a paint spray gun. It can be seen that by the operation of the supply/shut-off valve 14 according to the present invention, that no such pressure peak or dip will occur because of its operation. Therefore, there will be no noticeable change in the air pressure and supply characteristics to the other operating paint spray guns in the multiple-user system.

It will be appreciated that the diverting port 32 could also vent to some other place than to the atmosphere through a vent port in the valve body 18, not shown in this configuration.

Figure 5:
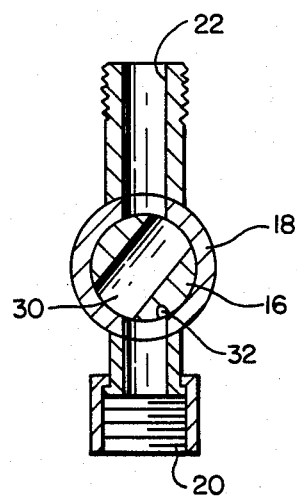
FIG. 5 is a cross section of the valve of FIG. 3 taken along line 5—5 of FIG. 3 with valve internal rotated to the position shown in FIG. 4.

Referring now to FIG. 5, the specific location of diverting port 32 relative to aperture 30 within the valve internal 16 of a supply/shut-off valve is of critical importance since it is necessary for the diverting port 32 to come into play by diverting inlet air through valve 14 to the atmosphere prior to the complete elimination of air flow through the valve and out of outlet port 22. An electrical analogy to such an operation is that the diverting port must be "made" before the aperture flow is "broken"; a make-before-break concept. Therefore, FIG. 5 indicates that diverting port 32 is encountered by inlet port 20 at an angular location of less than 90° from the axis of aperture 30. It is necessary to have the make before break location of diverting port 32 in order to assure a smooth transition between flow through aperture 30 and air flow through the pressure drop device diverting port 32.

It will be apparent from the above that the present invention provides a means for smoothly adding or removing a gas user to a multiple-user gas system so as to prevent pressure increases or decreases to the other users during the transition of adding or removing a user.

Having thus described this invention, what is claimed is:

1. In the combination of an air supply line serving as a manifold, one end of each of a plurality of branch lines being connected in fluid communication with said manifold, means for connecting an air using unit to the other end of each of said branch lines, means in each air using unit for starting and stopping air flow through the unit, and a valve connected within each branch line intermediate its ends, each branch being configured to supply air from said manifold in some predetermined amount to the connecting means, each said valve including a hollow body with an inlet and an outlet, said inlet being connected in fluid communication with the manifold and its associated branch line, said outlet being in fluid ocmmunication with the air using unit, the hollow of the body containing a rotary plug having means forming a passageway therethrough, means for rotating the plug relative to the body for aligning the passageway within the body to conduct air from said inlet to said outlet, means for forming at least one sliding seal between the body and the plug for preventing undesired air leaks to the atmosphere, means forming an aperature in said plug, one end of said aperture being in fluid communication with the atmosphere, the other end of said aperture being configured to terminate in a position at the surface of said plug which may be aligned with the inlet to the body, the plug, passageway means and aperture means being configured to alternatively (1) stop all air flow through the body, (2) bleed air through the aperture while some air from the inlet continues to traverse the passageway means from the inlet to the outlet, (3), allow air to traverse the passageway means only and (4) bleed air through the aperture only.

2. The combination of claim 1 wherein each body includes a cylindrical hollow, each associated plug being cylindrical, each sliding seal comprising two elastomeric O-rings, each O-ring (1) being disposed in an annular groove in the cylindrical surface of the plug and (2) sealingly engaging the surface of the cylindrical hollow.

3. The combination of claim 2 wherein the ends of the passageway means and the end of the aperture means which may align with the inlet all terminate at the cylindrical surface of a plug intermediate the two O-rings in the corresponding body.

4. The combination of claim 3 wherein the aperture means in each plug is configured to conduct about the same amount of air as the predetermined amount to be supplied to its associated connecting means.

5. The combination of claim 4 wherein the plug is locked in the body by a retaining ring disposed in a groove in said plug and abutting a surface on said body.

6. The combination of claim 1 wherein the plug is locked in the body by a retaining ring disposed in a groove in said plug and abutting a surface on said body.

* * * * *